United States Patent
Elbaz

(10) Patent No.: US 7,048,561 B1
(45) Date of Patent: May 23, 2006

(54) LIQUID TIGHT CONNECTOR

(75) Inventor: Shimon Elbaz, Rockaway Park, NY (US)

(73) Assignee: Superflex Ltd., Brooklyn, NY (US)

( * ) Notice: Subject to any disclaimer, the term of this patent is extended or adjusted under 35 U.S.C. 154(b) by 214 days.

(21) Appl. No.: 10/779,436

(22) Filed: Feb. 13, 2004

(51) Int. Cl.
*H01R 13/52* (2006.01)

(52) U.S. Cl. ............. 439/271; 174/65 R; 285/151.1; 439/519

(58) Field of Classification Search ........... 439/519, 439/427, 584, 445, 461–462, 271, 275, 2; 174/65 R, 65 SS, 65 G; 285/151.1, 231, 285/331, 345, 399, 422–423
See application file for complete search history.

(56) References Cited

U.S. PATENT DOCUMENTS

| | | | | |
|---|---|---|---|---|
| 2,570,406 A | * | 10/1951 | Troshkin et al. | 285/281 |
| 3,726,547 A | * | 4/1973 | Cox, Jr. | 285/149.1 |
| 5,051,541 A | * | 9/1991 | Bawa et al. | 174/65 SS |
| 6,196,597 B1 | * | 3/2001 | Karnes | 285/331 |
| 6,231,085 B1 | * | 5/2001 | Olson | 285/23 |
| 6,543,815 B1 | * | 4/2003 | Suzuki | 285/331 |
| 6,642,451 B1 | * | 11/2003 | Gretz | 174/65 G |
| 2004/0245776 A1 | * | 12/2004 | Evans et al. | 285/259 |

* cited by examiner

*Primary Examiner*—Michael C. Zarroli
(74) *Attorney, Agent, or Firm*—Seth Natter; Natter & Natter

(57) ABSTRACT

A liquid tight connector for non-metallic conduit is formed of a one piece body having a through bore. A sleeve extends inwardly from one end of the body and a threaded nipple extends inwardly from the other. Projecting transversely from the inner end of the nipple is a flange. A ferrule skirt extends from the flange toward the sleeve end of the body to define an annular channel concentric with the sleeve. An internal buttress thread is formed on the inner wall of the skirt. An end of a length of conduit is slipped over the end of the sleeve and into the mouth of the channel. The connector is rotated relative to the conduit, with the thread engaging an outer wall of the conduit to tightly draw the channel over the conduit. An outward flare is provided at the flange end of the sleeve to compress and seal the conduit.

18 Claims, 1 Drawing Sheet

LIQUID TIGHT CONNECTOR

BACKGROUND OF THE INVENTION

1. Field of the Invention

This invention relates generally to electrical wiring installations and more particularly to a liquid tight connector for flexible non-metallic electrical conduit.

2. Antecedents of the Invention

Liquid tight connectors for joining electrical conduit to junction boxes were primarily relegated to compression fittings and the like employing a compressible ring which encircled the conduit, together with a compression nut which served to compress the ring, as exemplified in U.S. Pat. No. 3,659,880.

Connectors for metallic conduit have been known to employ self-tapping internal threads into which the end of the conduit was rotatably driven. A typical example of such connectors is illustrated in U.S. Pat. No. 2,580,818. Such connectors required the employment of tools such as pipe wrenches in order to attain sufficient torque to deform the conduit and were unsuited for liquid tight applications.

In connection with a non-metallic flexible conduit, there has been proposed the employment of a connector comprising a threaded sleeve which engaged the inner wall of the conduit. The outer surface of the conduit was overlaid by a separate ferrule.

Other types of liquid tight connectors required a compressible sealing gasket, especially when the end of the conduit length was not cut along a perfect transverse plane.

SUMMARY OF THE INVENTION

A liquid tight connector for non-metallic flexible conduit comprises a one piece body having a bore. A cylindrical sleeve, having a diameter less than the internal diameter of the conduit, extends inwardly from one end of the body and a threaded nipple extends inwardly from the other end.

Projecting toward the sleeve end of the body is a ferrule skirt which defines an annular channel being between the sleeve and the skirt. Self-tapping buttress threads project from the inner wall of the skirt into the channel.

An end of a section of conduit is slipped over the end of the sleeve and into the channel. The conduit and/or connector is rotated relative to one another such that the thread bites into the outer wall of the conduit and draws the conduit into the channel. To provide a liquid tight seal, the end of the conduit is tightly compressed within the channel by an outward flare at the inner end of the sleeve.

An abutment flange projects transversely from the body at the inner end of the nipple, such that the nipple can be inserted through an opening in an electrical junction box with the flange abutting the outside surface of the box. A conventional nut is threaded over the portion of the nipple projecting into the box to secure the connector.

From the foregoing compendium, it will be appreciated that it is an aspect of the present invention to provide a liquid tight connector for non-metallic flexible conduit of the general character described which is not subject to the disadvantages of the antecedents of the invention aforementioned.

A feature of the present invention is to provide a liquid tight connector for non-metallic flexible conduit of the general character described which is simple to use.

To provide a liquid tight connector for non-metallic flexible conduit of the general character described which provides a high tensile strength coupling between the connector and the conduit for resistance against separation is a consideration of the present invention.

Another aspect of the present invention is to provide a liquid tight connector for a non-metallic flexible conduit of the general character described which is relatively low in cost.

Another feature of the present invention is to provide a liquid tight connector for a non-metallic flexible conduit of the general character described which is readily adapted for economical mass production fabrication.

Another consideration of the present invention is to provide a liquid tight connector for a non-metallic flexible conduit of the general character described formed of one piece unitary construction.

A still further aspect of the present invention is to provide a liquid tight connector for non-metallic flexible conduit of the general character described which assures a liquid tight seal between the connector and the conduit without need for a sealing ring or gasket.

To provide a liquid tight connector for non-metallic flexible conduit of the general character described which is in compliance with electrical codes is a further feature of the present invention.

Yet another consideration of the present invention is to provide a liquid tight connector for non-metallic flexible conduit of the general character described which is lightweight, yet durable.

Other aspects, features and considerations of the present invention in part will be obvious and in part will be pointed out hereinafter.

With these ends in view, the invention finds embodiment in the various combinations of elements, arrangements of parts and series of steps by which the aforesaid aspects, features and considerations and certain other aspects, features and considerations are attained, or with reference to the accompanying drawings and the scope of which will be more particularly pointed out and indicated in the appended claims.

BRIEF DESCRIPTION OF THE DRAWINGS

In the accompanying drawings in which is shown some of the various possible exemplary embodiments of the invention.

DESCRIPTION OF THE PREFERRED EMBODIMENT

Figure 1:
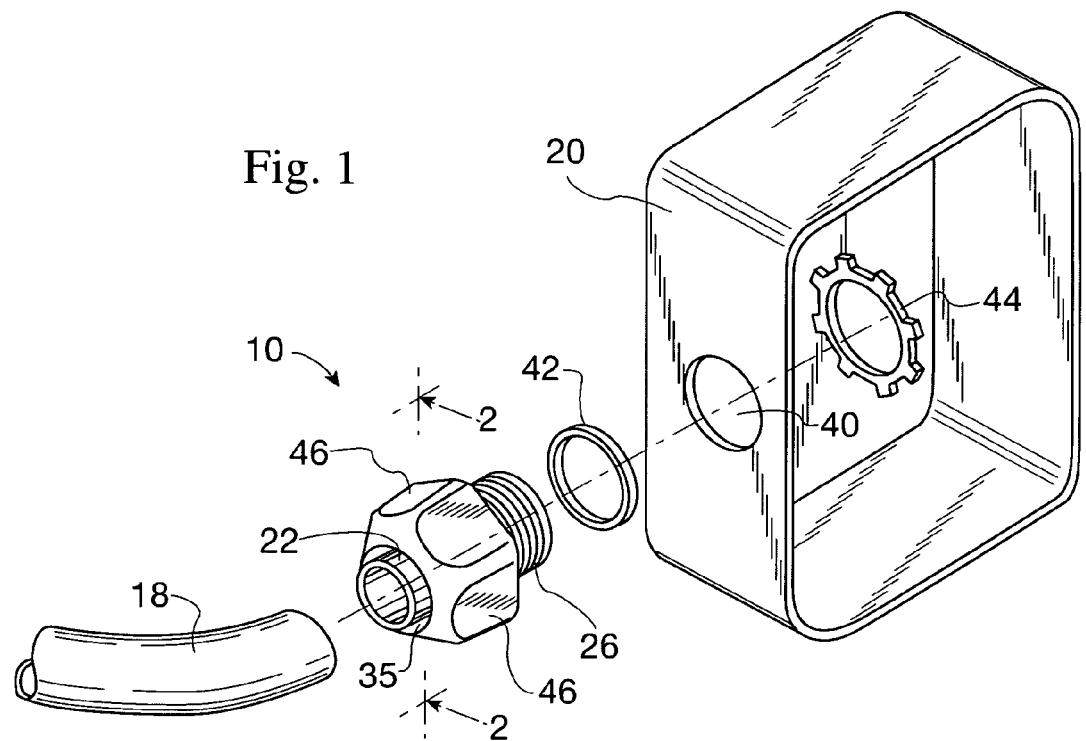
FIG. 1 is an exploded perspective view of a typical electrical conduit installation employing a liquid tight connector constructed in accordance with an embodying the invention for coupling a length of non-metallic flexible conduit to an electrical junction box.

Referring now in detail to the drawings, the reference numeral 10 denotes generally a liquid tight connector for non-metallic flexible conduit constructed in accordance with and embodying the invention. The connector 10 comprises a lightweight, durable thermoplastic, e.g. polyvinyl chloride, one-piece body 12 fabricated as by injection molding.

A through bore 14 is coaxial with a longitudinal axis 16 and serves as a passageway for electrical wires (not shown) which are carried within a non-metallic flexible electrical conduit 18 through the connector 10 and into an electrical junction box 20.

The conduit 18 comprises conventional non-metallic flexible liquid tight electrical conduit having a non-metallic helical reinforcing core such as non-metallic liquid tight Type B. Such conduit may be fabricated by extrusion of a flexible polyvinyl chloride over a rigid polyvinyl chloride helix core.

A smooth cylindrical sleeve 22, having an outer diameter dimensioned for insertion into the conduit 18, extends inwardly from a proximal end 24 of the connector 10 and a threaded nipple 26 extends inwardly from a distal end 28 of the connector. The nipple 26 terminates with a transverse planar flange 30 which projects radially.

From the flange 30, an axial ferrule skirt 32 extends toward the proximal end 24. The ferrule skirt 32 includes a cylindrical inner wall 34 which defines an annular channel 35 between the inner wall 34 and the outer surface of the sleeve 22.

Pursuant to the invention, a self-tapping buttress thread 36 is formed on the inner wall 34 and projects into the channel 35. An end of a length of conduit 18 is joined to the connector 10 by being slipped over the sleeve 22 and urged into the channel 35. Upon contact between the conduit 18 and the buttress thread 36, the connector 10 and/or the conduit 18 are rotated deasil relative to one another. The buttress thread 36 is configured to aggressively bite into the yieldable outer periphery of the conduit 18 and draw the channel 35 over the conduit 18. Whether the conduit is said to move relative to the connector or the connector relative to the conduit is immaterial to the invention and should be construed alternatively and conjunctively.

Figure 2:
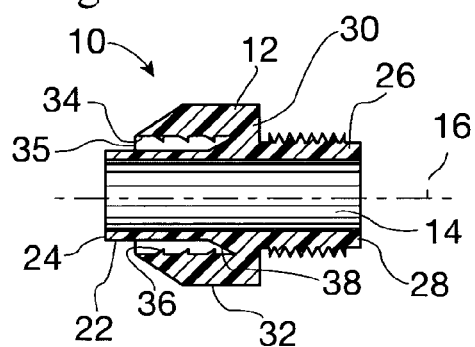
FIG. 2 is an enlarged scale longitudinal sectional view through the connector and showing a sleeve extending inwardly from one end of the connector and a threaded nipple extending inwardly from the opposite end, together with a ferrule skirt which extends toward the sleeve end of the connector.

Upon approaching the blind end of the channel 35, the end of the conduit 18 engages an outward flare 38 of the sleeve, which serves to tightly compress and seal the conduit. As will be noted from an examination of FIG. 2 and FIG. 3, the outward flare is axially registered with, i.e. overlies, a portion of the buttress thread 36, such that the end portion of the conduit is forced against the thread. Further, the outer periphery of the sleeve 22 serves to assure that the interior of the conduit is not deformed as a result of engagement between the buttress thread 36 and the outer periphery of the conduit.

The buttress thread 36 is appropriately configured with an aggressive slope for drawing the conduit into the channel or advancing the channel over the conduit. Retention of the conduit in the channel in the presence of high tensile forces is assured by the radial trailing face of the buttress thread.

It should be appreciated that with the buttress thread 36 engaging the outer surface of the conduit 18, as opposed to a thread formed on the sleeve engaging the interior of the conduit, increased linear surface area of thread engagement is provided for increased ease in drawing the conduit 18 into the channel 35 or drawing the channel 35 over the conduit 18 and, significantly, for providing a stronger coupling having high tensile strength for increased resistance against separation. Further, it is unnecessary to have threads with disproportionate thread height. With a typical channel 35 having a span or width in the order of 3.0 mm–3.3 mm, the buttress thread 36 projects into the channel a distance less than 11.0 mm, e.g. in the order of 0.6 mm–0.7 mm and has a pitch in the order of 4.5 mm–5.0 mm. Less torque is required to tightly seal the conduit than if threads were formed in the sleeve 22.

Figure 3:
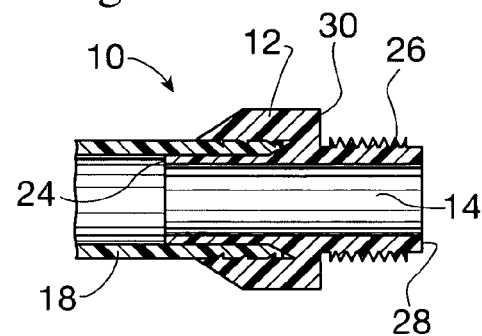
FIG. 3 is a longitudinal sectional view through the connector, similar to FIG. 2, showing a section of conduit tightly secured in a channel formed between the sleeve and the ferrule skirt.

In FIG. 3, the connector 10 is illustrated with a section of conduit 18 securely seated and sealed in the channel 35. After the conduit has been sealed in the channel 35, the connector 10 may be secured to the electrical junction box 20. With attention directed to the exploded view of FIG. 1, it will be noted that the nipple 26 is inserted through a knockout or other opening 40 formed in a wall of the junction box 20. Prior to insertion of the nipple 26 through the opening 40, an annular gasket or "O" ring 42 is slipped over the nipple 26 and against the face of the flange 30.

A nut 44 is threaded over the nipple 26 from inside the junction box 20 to secure the connector 10 to the junction box 20, with the flange 30 in substantially abutting contact against the outer surface of the junction box wall. The "O" ring or gasket 42 assures a liquid tight seal between the connector 10 and the junction box 20.

It should be noted that the outer periphery of the axial ferrule skirt 32 is configured with a plurality of planar faces 46 which may serve as convenient gripping surfaces for a wrench or the like to facilitate tightening of the nut 44 or to assist in seating the conduit in the channel.

Figure 4:
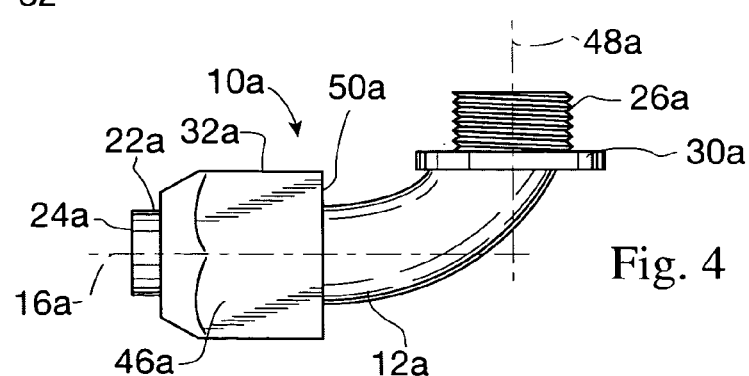
FIG. 4 is a plan view of an elbow connector embodying the invention, wherein a sleeve and a nipple are perpendicular to one another.

In FIG. 4 there is illustrated an alternate embodiment of the invention wherein the connector is configured as an elbow connector 10a. In the description of the FIG. 4 embodiment, like numerals have been employed to denote like components of the prior embodiment, however bearing the suffix "a".

The elbow connector 10a includes a unitary one-piece body 12a having a through bore. A sleeve 22a extends along a first axis 16a inwardly from one end 24a of the connector body 12a while a threaded nipple 26a extends inwardly along a perpendicular axis 48a. The axes 16a, 48a intersect one another.

The nipple 26a terminates at a planar flange 30a which is perpendicular to the axis 48a. As with the prior embodiment, the flange 30a serves as an abutment or stop which contacts an outer wall of an electrical junction box when the elbow coupling 10a is secured to the junction box, in a manner substantially identical to that described with reference to the prior embodiment.

From the flange 38a, the body 12a of the connector 10a bends or curves such that the bore through the body 12a is registered about the transverse axis 16a, as illustrated in FIG. 4.

A ferrule skirt 32a projects from a flange 50a which lies in a plane perpendicular to the axis 16a. The ferrule skirt 32a is substantially identical to the ferrule skirt 32 previously described with reference to the prior embodiment and includes an inner cylindrical wall which defines a channel as well as a buttress thread extending from the inner wall into the channel.

In a manner identical to that of the prior embodiment, the sleeve 22a includes an outward flare at the blind end of the channel for tightly sealing a length of flexible non-metallic conduit in the connector 10a. The outer face of the ferrule skirt includes a plurality of planar faces 46a which serve as optional gripping surfaces for stabilizing the connector 10a during any torque application.

This is will be seen that there is provided a liquid tight connector for flexible non-metallic conduit which achieves the various aspects, features and considerations of the present invention and which is well-suited to meet the conditions of practical usage.

Since various possible embodiments might be made at the present invention and since various changes might be made in the exemplary embodiments shown herein without departing from the spirit of the invention, it should be understood that all matter herein described or shown in the accompanying drawings is to be interpreted as illustrative and not in a limiting sense.

Having thus described the invention there is claimed as new and desired to be secured by Letters Patent:

1. A liquid tight connector for non-metallic electrical conduit, the connector comprising a one-piece unitary thermoplastic body having a bore therethrough, the body including a cylindrical sleeve, a ferrule skirt coaxial with the sleeve, the ferrule skirt having a cylindrical inner wall, the connector having an annular cylindrical channel defined by the sleeve and the inner wall, a thread formed on the inner wall, the thread extending radially into the channel, the sleeve being dimensioned such that it may be received within an end of a length of selected non-metallic conduit and the non-metallic conduit may be slipped over the sleeve and into the channel, the channel having a blind end and the sleeve including an outward flare adjacent the blind end, the flare extending toward the cylindrical inner wall, at least a portion of the flare being axially registered with a portion of the thread, whereby upon rotation of the connector relative to the conduit, the thread engages an outer surface of the conduit and draws the conduit into the channel and the end of the conduit is tightly compressed against the portion of the thread and sealed in the channel between the flare and the cylindrical inner wall.

2. A liquid tight connector for non-metallic electrical conduit as constructed in accordance with claim 1 wherein the flare extends to the cylindrical inner wall.

3. A liquid tight connector for non-metallic electrical conduit as constructed in accordance with claim 1 wherein the body is formed of polyvinyl chloride.

4. A liquid tight connector for non-metallic electrical conduit as constructed in accordance with claim 1 wherein the thread comprises a buttress thread, whereby high resistance against tensile force separation is attained.

5. A liquid tight connector for non-metallic electrical conduit as constructed in accordance with claim 1 wherein the body further includes a nipple, the bore extending through the nipple, whereby the connector may be fastened to an electrical junction box with a conventional nut inserted over one end of the nipple.

6. A liquid tight connector for non-metallic electrical conduit as constructed in accordance with claim 5 wherein the body includes a transverse flange, the flange being positioned at the other end of the nipple, the flange being dimensioned to engage an exterior surface of an electrical junction box when the nipple is inserted through an opening in the electrical junction box.

7. A liquid tight connector for non-metallic electrical conduit as constructed in accordance with claim 6 wherein the sleeve and the nipple are coaxial.

8. A liquid tight connector for non-metallic electrical conduit as constructed in accordance with claim 6 wherein the nipple extends along an axis perpendicular to and intersecting the axis of the sleeve, whereby an elbow connector is provided.

9. A liquid tight connector for non-metallic electrical conduit as constructed in accordance with claim 6 wherein the ferrule skirt extends from the transverse flange.

10. A liquid tight connector for non-metallic electrical conduit as constructed in accordance with claim 1 wherein the outer surface of the ferrule skirt includes a plurality of planar faces whereby the body may be gripped by a suitable tool.

11. A liquid tight connector for non-metallic electrical conduit as constructed in accordance with claim 4 wherein the buttress thread projects radially inwardly from the inner wall of the ferrule skirt a distance less than 1.0 mm.

12. A method of connecting a length of flexible non-metallic electrical conduit to an electrical junction box having an access aperture, the method comprising the steps of:
 a) providing a one piece molded thermoplastic connector having a smooth walled cylindrical sleeve at one end, a threaded nipple at the other end, a transverse flange intermediate the ends and a bore extending from end to end,
 b) surrounding at least a portion of the smooth walled sleeve with a concentric cylindrical wall to provide an annular cylindrical channel,
 c) providing a thread projecting radially inwardly from the cylindrical wall and into the channel,
 d) dimensioning the smooth walled sleeve and the cylindrical wall such that an end of a length of flexible non-metallic electrical conduit can be received within the channel,
 e) inserting the smooth walled sleeve into an end of the length of conduit,
 f) sliding the conduit over the smooth walled sleeve and into the channel,
 g) seating the conduit within the channel by engaging a surface of the conduit with the thread and providing relative rotation between the connector and the conduit,
 h) sealing the conduit by forcing an end portion of the conduit against the cylindrical wall,
 i) inserting the nipple through the access aperture of the electrical junction box, and
 j) fastening the connector to the electrical junction box by threading a nut over the nipple and tightening the nut until the flange abuts an outer surface of the electrical junction box.

13. A method of connecting a length of flexible non-metallic electrical conduit to an electrical junction box in accordance with claim 12 wherein the end portion of the conduit is forced against the cylindrical wall by providing the smooth walled sleeve with an outward flare adjacent an interior end of the channel.

14. A method of connecting a length of flexible non-metallic electrical conduit to an electrical junction box in accordance with claim 13 wherein the outward flare overlies a portion of the thread.

15. A liquid tight connector for non-metallic flexible electrical conduit, the connector comprising a one-piece thermoplastic body, the body having a cylindrical sleeve, a ferrule skirt overlying at least a portion of the sleeve and a nipple, the nipple being configured to join the coupling to an electrical junction box, a first end of the nipple coinciding with an end of the body and a second end of the nipple positioned intermediate the ends of the body, the body including a transverse flange at the second end of the nipple, the ferrule skirt including a cylindrical inner wall, the inner wall of the ferrule skirt and the sleeve defining a channel dimensioned to accommodate an end portion of a length of flexible non-metallic electrical conduit, a buttress thread projecting radially inwardly from the inner wall of the ferrule skirt into the channel and extending axially along the channel, the buttress thread being dimensioned to engage the outer surface of the end portion of the selected length of conduit, whereby rotation of the coupling relative to the conduit retentively seals the end portion of the selected length of conduit in the channel.

16. A liquid tight connector as constructed in accordance with claim 15 wherein the ferrule skirt extends from the flange.

17. A liquid tight connector as constructed in accordance with claim 15 wherein the buttress thread projects radially inwardly from the inner wall of the ferrule skirt a distance less than 1.0 mm.

18. A liquid tight connector as constructed in accordance with claim 15 wherein the cylindrical sleeve is smooth walled.

* * * * *